US006915144B2

(12) United States Patent
Asai (10) Patent No.: US 6,915,144 B2
(45) Date of Patent: Jul. 5, 2005

(54) DATA TRANSFER DISPLAY METHOD

(75) Inventor: Takayuki Asai, Tokyo (JP)

(73) Assignee: NEC Corporation, Tokyo (JP)

( * ) Notice: Subject to any disclaimer, the term of this patent is extended or adjusted under 35 U.S.C. 154(b) by 522 days.

(21) Appl. No.: 09/732,721

(22) Filed: Dec. 11, 2000

(65) Prior Publication Data

US 2002/0177469 A1 Nov. 28, 2002

(30) Foreign Application Priority Data

Dec. 14, 1999 (JP) ............................................ 11-354100

(51) Int. Cl.$^7$ ................................................ H04Q 7/20
(52) U.S. Cl. ........................ 455/566; 455/517; 455/558
(58) Field of Search ................................ 455/566, 403, 455/414, 426, 422.1, 412.1–2, 413, 466, 517, 558, 412.2

(56) References Cited

U.S. PATENT DOCUMENTS

| | | | |
|---|---|---|---|
| 4,967,190 A | * 10/1990 | Fujisaki et al. | ............... 345/2.1 |
| 5,895,471 A | 4/1999 | King et al. | |
| 6,289,212 B1 | * 9/2001 | Stein et al. | ............... 455/412.1 |
| 6,393,014 B1 | * 5/2002 | Daly et al. | ................... 370/352 |
| 6,473,609 B1 | * 10/2002 | Schwartz et al. | ........... 455/406 |
| 6,549,773 B1 | * 4/2003 | Linden et al. | ............ 455/426.1 |
| 6,625,447 B1 | * 9/2003 | Rossmann | ............. 340/825.27 |

FOREIGN PATENT DOCUMENTS

| | | |
|---|---|---|
| JP | H11-284517 A | 10/1999 |
| JP | H11-317735 A | 11/1999 |
| JP | H11-328078 A | 11/1999 |
| JP | 2002-501232 A | 1/2002 |
| JP | 2002-506324 A | 2/2002 |

OTHER PUBLICATIONS

Peter King and Tim Hylands, Eds.: "Handheld Device Markup Language Specification" (online) Apr. 11, 1997, World Wide Web Consortium (Searched Dec. 10, 2003), Internet.
Takao Horita and Masaru Miyake, HTML Reference, OpenDesign, Japan, CQ, Shuppan KK, Apr. 1, 1996, vol. 3, No. 2 p. 136.
Database—WAP Forum "Online", Nov. 4, 1999, "WAP WML Specification Version 1.2" retrieved from HTTP://WWW2.WAPFORUM.ORG/TECH/DOCUMENTS/SPEC–WML019991104.PDF, p. 65.
WAP White Paper, AU–System Radio, Feb. 1999, pp. 1–22.
J. Farringdon et al., "Co–Modal Browser—An Interface for Wearable Computers", IEEE Comput. Soc., Oct. 18, 1999, pp. 45–51.

* cited by examiner

Primary Examiner—CongVan Tran
(74) Attorney, Agent, or Firm—Sughrue Mion, PLLC (57) ABSTRACT

In a data transfer display method, first unit transfer data containing at least a plurality of unit display data is transferred from a first transmission source to a transmission destination. When display of unit display data of the first unit transfer data is designated at the transmission destination, the unit display data of the first unit transfer data and another display data are displayed.

9 Claims, 4 Drawing Sheets

DATA TRANSFER DISPLAY METHOD

BACKGROUND OF THE INVENTION

The present invention relates to a data transfer display method of connecting an information communication terminal such as a portable telephone to a network such as the Internet and using information on the network.

Various limitations are imposed on portable telephones. For example, the display sizes are small, and the performance of CPUs (Central Processing Units) and memory capacities are limited. A browser perfectly conforming to HTML (HyperText Markup Language) cannot be installed in such a portable telephone. For this reason, to browse contents prepared on a server in a widearea network such as the Internet by using a portable telephone, a micro-browser optimized for portable telephones must be used. In addition, contents must be described by using a simple language designed for the micro-browser.

As such a network connection protocol for portable telephones, WAP (Wireless Application Protocol) is available. By using a WAP portable telephone, the user can connect a portable terminal such as a portable telephone to the Internet or the like with simple operation, and can use electronic mail and other contents. As a description language for contents used in WAP, WML (Wireless Markup Language) is available. If contents described in WML are prepared in a server, the user can display/browse the contents with the micro-browser by connecting a WAP portable terminal to the server through the Internet.

WML is based on XML (Extensible Markup Language) that can freely define tags. A tag is a reserved word, which is used to adjust a text and describe a link destination of a file. WML includes the concepts of "Card" and "Deck". A card (unit display data) corresponds to 1-page data. Only one card is displayed on the display of a portable telephone at once.

A deck (unit transfer data) is a collection of a plurality of cards, and serves as a unit for a portable telephone in downloading per access. If, therefore, contents are created such that a card to be displayed next exists in the same deck, the next card can be quickly displayed without accessing the link destination again. As a consequence, according to the mechanism of WML, the number of times of connection to the server can be decreased, and the load on the gateway can be reduced.

Figure 4:
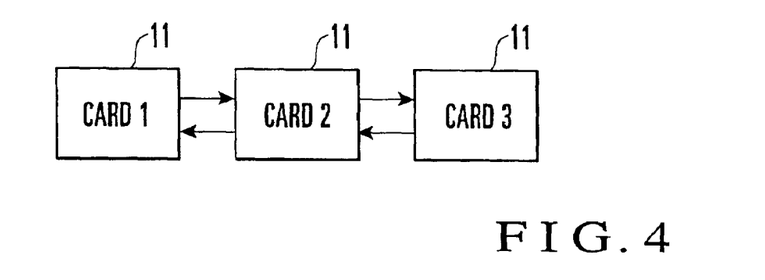
FIG. 4 is a view showing the transition of display of cards according to conventional WAP.

In displaying the above cards, when the same card is to be browsed a plurality of number of times in browsing operation, a plurality of cards 11 can be continuously displayed and browsed by using the "go" command or "prev" command, as shown in FIG. 4, according to the specifications of the current WAP.

Figure 5:
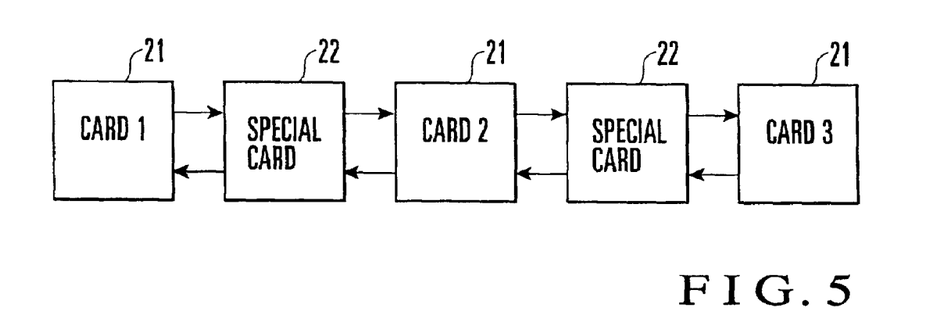
FIG. 5 is a view showing the transition of display of cards and special cards according to conventional WAP.

In displaying such contents, e.g., banners for advertisements, the user may use a special card 22 which he/she wants to display every time he/she turns to a card 21 or display it once for a plurality of number of times he/she turns to the card 21. To execute screen browsing shown in FIG. 5, one deck in contents prepared in a server is described as indicated by description sample 1 as follows:

Description Sample 1
. . . . .
```
<wml>
    <card id="card1">
        <do type="ACCEPT"label="Next">
            <go href="#specialcard1"/>
        </do>
        <p>
        CARD 1 <br/>
        Press ACCEPT to go to Next Card>
        </p>
    </card>
    <card id="specialcard1">
        <do type="ACCEPT"label="Next">
            <go href="#card2"/>
        </do>
        <to type="PREV"label="Prev">
            <prv/>
        </do>
        <p>
        SPECIAL CARD <br/>
        Press ACCEPT to go to Next Card <br/>
        Press PREV to go to Previous Card
        </p>
    </card>
    <card id="card2">
        <do type="ACCEPT"label="Next">
            <go href="#specialcard2"/>
        </do>
        <do type="PREV"label="Prev">
            <prev/>
        </do>
        <p>
        CARD 2 <br/>
        Press ACCEPT to go to Next Card <br/>
        Press PREV to go to Previous Card
        </p>
    </card>
    <card id="specialcard2">
        <do type="ACCEPT"label="Next">
            <go href="#card3"/>
        </do>
        <do type ="PREV"label="Prev">
            <prev/>
        </do>
        <p>
        SPECIAL CARD <br/>
        Press ACCEPT to go to Next Card <br/>
        Press PREV to go to Previous Card
        </p>
    </card>
    <card id="card3">
        <do type="PREV"label="Prev">
            <prev/>
        </do>
        <p>
        CARD 3 <br/>
        Press PREV to go to Previous Card
        </p>
    </card>
</wml>
```
. . . . .

Figure 6:
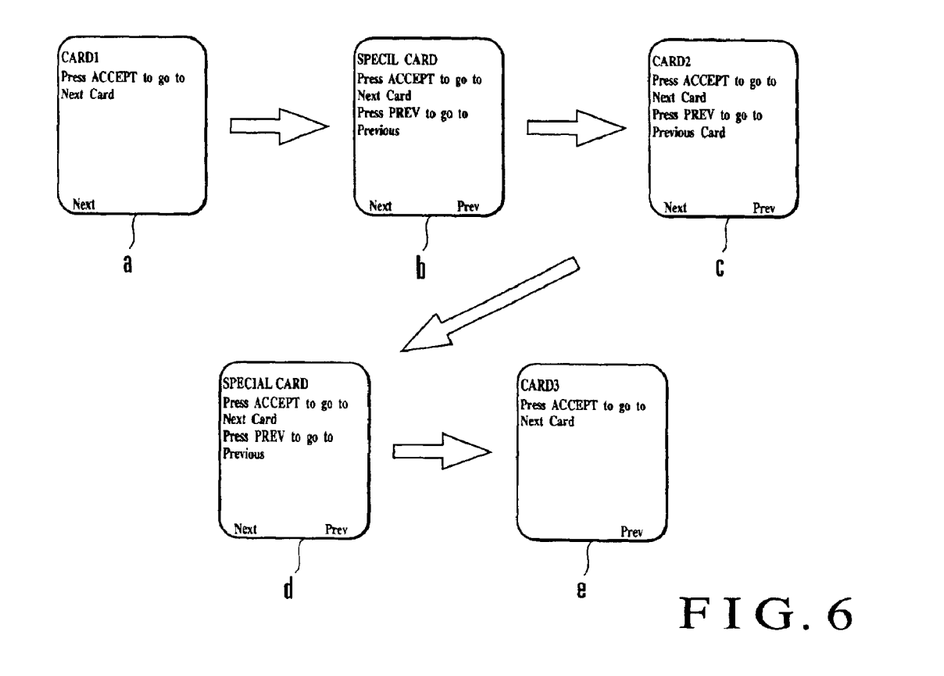
FIG. 6 is a view showing how cards are displayed according to description sample 1.

The deck described in description example 1 described above is displayed on the screen of the portable terminal in the order of a→b→c→d→e, as shown in FIG. 6.

As descried above, however, if there are special cards 22 which the user wants to automatically display, a plurality of special cards 22 must be arranged in a series of cards 21 before the cards are displayed on the browser in the portable terminal according to the current WAP protocol, as shown in FIG. 5. To display the special cards 22 arranged in the series of cards 21, different IDs must be assigned to the respective special cards 22, and card data corresponding to the number of times the user is made to browse cards must be sent out from the server to the terminal. The same applies to a case wherein the special cards 22 have the same contents. For this reason, in the prior art, one deck received by a portable terminal contains a large amount of wasteful data.

In some case, after a given card is displayed, another card in a deck having another URL is displayed, and the browser returns to the initial card. In this case, according to the current WAP standards, the browser must describe the URL of the previous (link source) URL in the deck at the link destination. For this reason, the user cannot refer to the same deck from different decks.

As described above, in conventional data communication using WAP or the like, data received by an information communication terminal such as a portable telephone contains large wasteful data, resulting in an increase in the load on the network.

SUMMARY OF THE INVENTION

It is an object of the present invention to provide a data transfer display method which suppresses waste of data received by an information communication terminal in data communication in an information communication network.

In order to achieve the object of the present invention, there is provided a data transfer display method comprising the steps of transferring first unit transfer data containing at least a plurality of unit display data from a first transmission source to a transmission destination, and when display of unit display data of the first unit transfer data is designated at the transmission destination, displaying the unit display data of the first unit transfer data and another display data.

DESCRIPTION OF THE PREFERRED EMBODIMENT

The present invention will be described in detail below with reference to the accompanying drawings.

Figure 1:
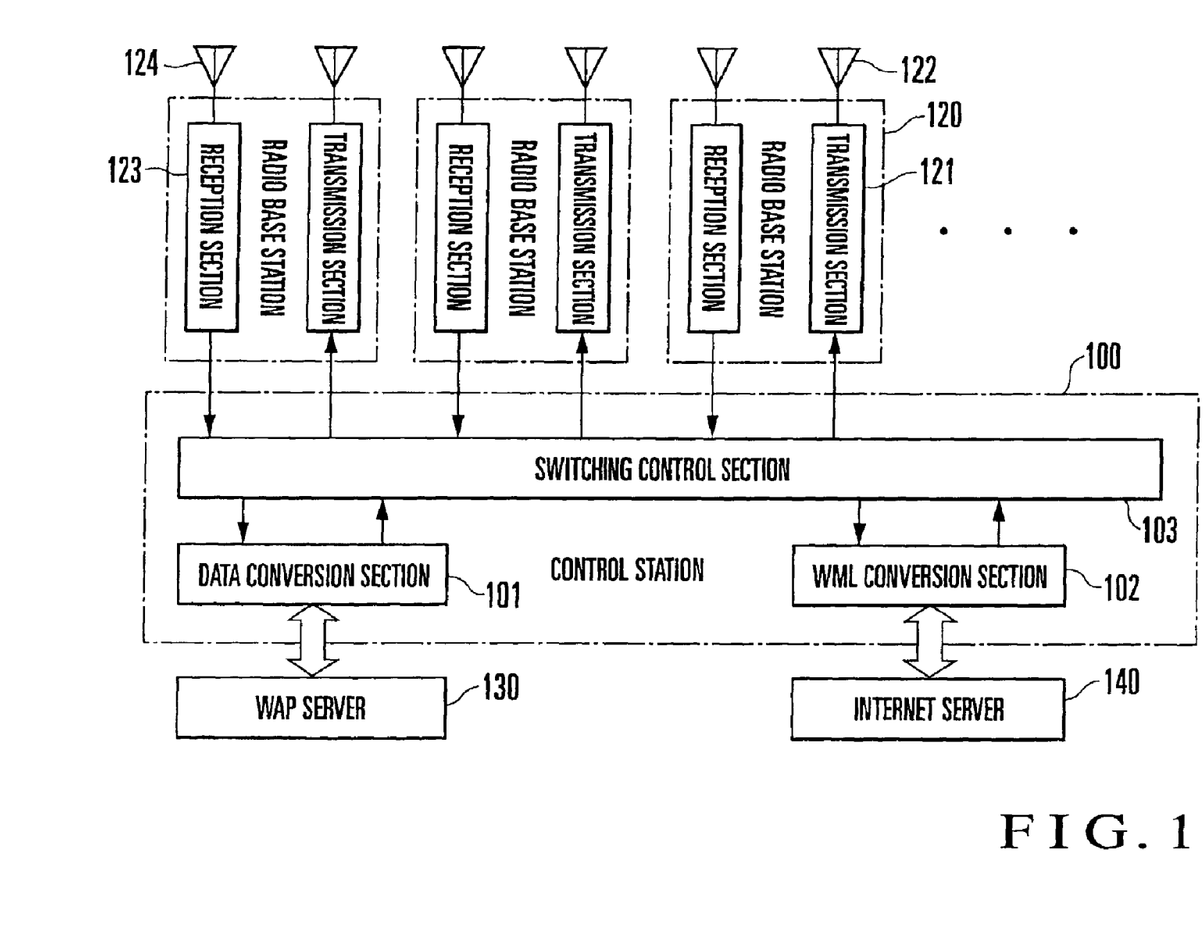
FIG. 1 is a block diagram showing the schematic arrangement of a WAP gateway according to an embodiment of the present invention.

According to WAP as a network connection protocol for information communication terminals such as portable telephones, contents described in WML and prepared in a server are distributed to WAP terminals through a WAP gateway. A WAP gateway is comprised of a control station 100 and radio base station 120, as shown in FIG. 1.

The control station 100 includes a data conversion section 101 which is connected to a WAP server 130 to decode and encode WAP data, and a WML conversion section 102 which is connected to an Internet server 140 to convert data described in the HTML language used in the Internet into data described in WML. The data converted by the WML conversion section 102 is sent to the data conversion section 101 to be encoded into WAP data. The data conversion section 101 encodes the data distributed from the WAP server 130 into WAP data and transfers it to a switching control section 103. The data conversion section 101 also decodes data from the switching control section 103 and transmits the data to the WAP server 130.

A plurality of radio base stations 120 each having a transmission section 121, transmission antenna 122, reception section 123, and reception antenna 124 are connected to the switching control section 103 of the control station 100. Data distributed from the WAP server 130 is sent to the radio base station 120 through the data conversion section 101 and switching control section 103. The radio base station 120 transmits the data from the transmission section 121 to each radio terminal (to be described later) through the transmission antenna 122.

Data transmitted from each radio terminal is received by the reception antenna 124 of the radio base station 120 and transferred to the switching control section 103 through the reception section 123. The data transferred from each radio terminal to the switching control section 103 is transferred to the WAP server 130 through the data conversion section 101. If the address of data transmitted from a given radio terminal corresponds to the Internet server 140, the data is converted by the WML conversion section 102 and then transferred to the Internet server 140.

Figure 2A:
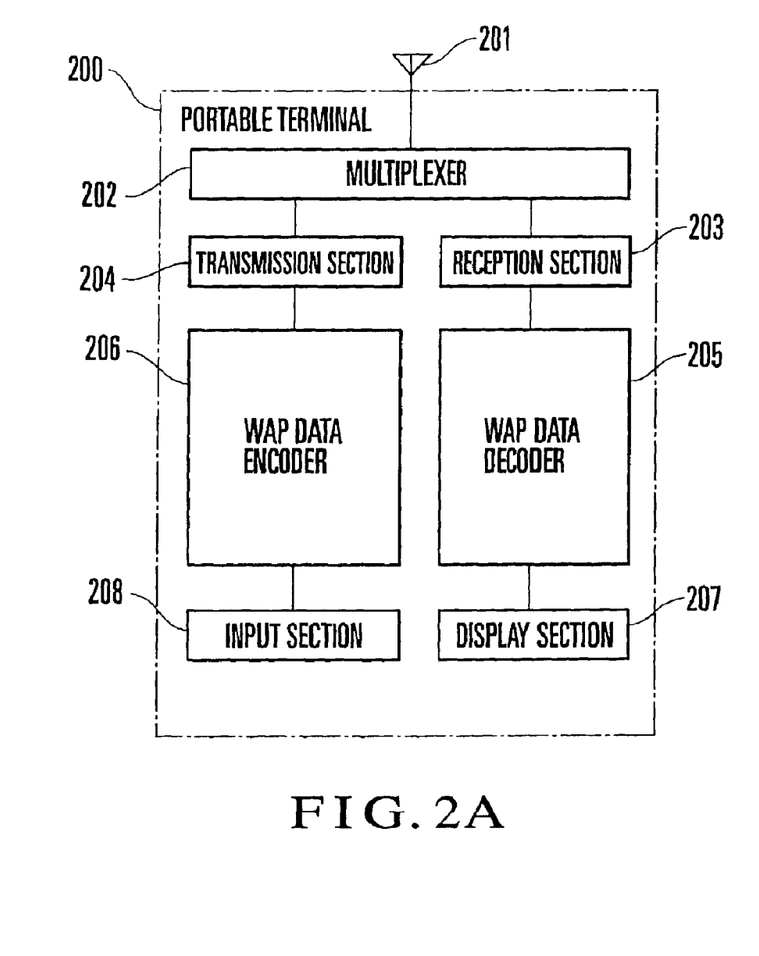
FIG. 2A is a block diagram showing the schematic arrangement of a radio terminal for performing radio communication with a control station in FIG. 1.

An information communication terminal, e.g., a portable radio terminal, for performing radio communication with the control station 100 has the arrangement shown in FIG. 2A. A portable terminal 200 is comprised of an antenna 201, a multiplexer 202 connected to the antenna 201, a reception section 203 and transmission section 204 which are connected to the antenna 201 through the multiplexer 202, a WAP data decoder 205 connected to the reception section 203, a WAP data encoder 206 connected to the transmission section 204, a display section 207 connected to the WAP data decoder 205, and an input section 208 connected to the WAP data encoder 206.

Figure 2B:
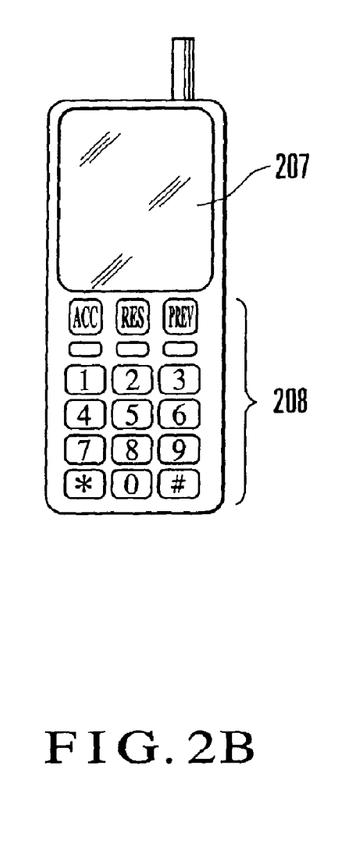
FIG. 2B is a front view of the radio terminal shown in FIG. 2A.

As shown in FIG. 2B, in the portable terminal 200, the display section 207 occupies almost the upper half area of the surface of the casing, and the input section 208 having a ten-key pad and function keys are arranged on the remaining area. The display section 207 displays data transmitted from the control station 100, the state of internal data in the portable terminal 200, and the like.

In the portable terminal 200 described above, data (deck: unit transfer data) transmitted from the control station 100 is received by the reception section 203 through the antenna 201 and multiplexer 202. This data is decoded by the WAP data decoder 205 and displayed on the display section 207. Input data from the input section 208 is encoded by the WAP data encoder 206. The resultant data is then transmitted from the transmission section 204 through the multiplexer 202 and antenna 201.

In the WAP environment configured in the above manner, according to the present invention, contents data (WAP data) to be prepared in a WAP server is described as follows. Note that in the following description, the contents data is described in the WML language complying with the latest WAP standards (WAP Ver.1.1) to refer to two cards (unit display data) and also refer to a special card (special unit display data) twice on the portable terminal side.

```
Description Sample 2
.....
<wml>
    <card id="card1">
        <do type="ACCEPT"label="Next">
            <disp href="#specialcard"/>
            <go href="#card2"/>
        </do>
        <p>
        CARD 1 <br/>
        Press ACCEPT to go to Next Card>
        </p>
    </card>
    <card id="card2">
        <do type="ACCEPT"label="Next">
            <disp href="#specialcard"/>
            <go href="#card3"/>
        </do>
        <do type ="PREV"label="Prev">
            <prv/>
        </do>
        <p>
        CARD 2 <br/>
        Press ACCEPT to go to Next Card <br/>
        Press PREV to go to Previous Card
        </p>
    </card>
    <card id="card3">
        <do type="PREV"label="Prev">
            <prev/>
        </do>
        <p>
        CARD 3 <br/>
        Press PREV to go to Previous Card
        </p>
    </card>
    <card id="specialcard">
        <p>
        SPECIAL CARD <br/>
        </card>
</wml>
.....
```

In this embodiment, as in, for example, "<dsip href="#specialcard"/>" in description sample 2 described above, a new "disp" command is set to describe a program for contents display to refer to two "cards" and "special card" twice. In description sample 2, executing the newly prepared "disp" command will eliminate the necessity to send the data of cards with the same contents twice or more. When the "disp" command is executed, "card" designated at the execution of the "disp" command is displayed first, and the control is restored to continue a series of contents display operations.

The "<disp" command in description sample 2 is described in the format of "<disp href="url"/. . " like other commands(Task Element) in the WML language. In this case, "url" indicates the location (URL: Uniform Resource Locator) or ID of a server in which a card to be displayed in temporarily stored.

In description sample 2, "disp" commands are set between the card 1 and card 2 and between card 2 and card 3. However, these commands need not be set between all cards, and the "disp" command may be used for a portion where a special card is to be displayed.

Figure 3:
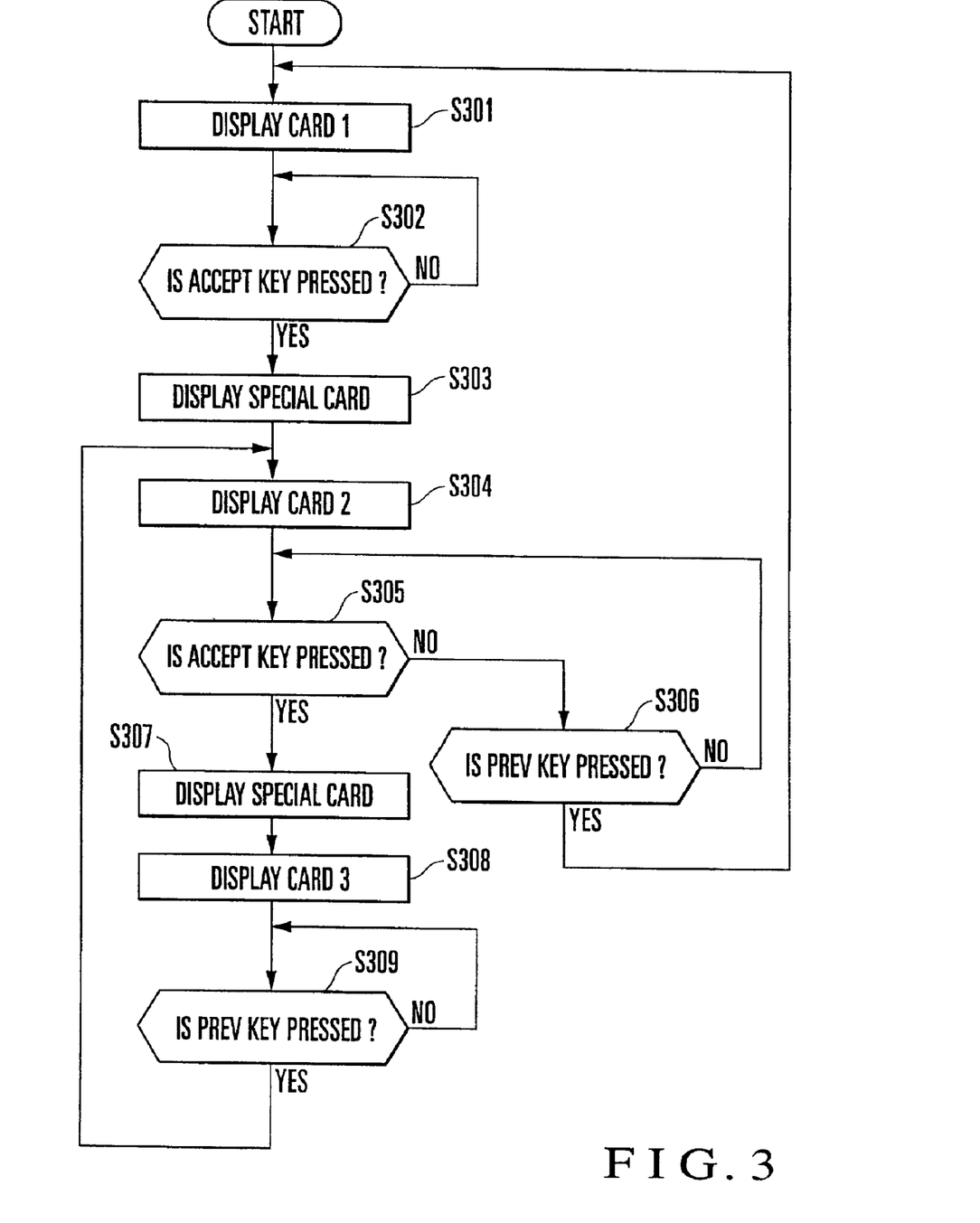
FIG. 3 is a flow chart showing data transfer display operation in the radio terminal shown in FIGS. 2A and 2B.

The operation for the contents displayed on the portable terminal 200 connected to the WAP server 130 according to the program indicated by description sample 2 will be described next with reference to the flow chart of FIG. 3.

First of all, when the portable terminal 200 receives the data of one deck indicated by description sample 2 from the WAP server 130 in step S301, the portable terminal 200 displays "CARD 1" in the contents displayed on the display section 207. In step S302, the portable terminal 200 waits for an "ACCEPT" key input. When the user presses the "ACCEPT" key in this stage, the portable terminal 200 displays "SPECIALCARD" on the display section 207. Thereafter, "CARD 2" is displayed in step S304.

After "CARD 2" is displayed, the portable terminal 200 waits for an "ACCEPT" key input. If there is no "ACCEPT" key input, the portable terminal 200 waits for a "PREV" key input in step S306. That is, in steps S305 and S306, the portable terminal 200 is made to wait for an "ACCEPT" key input and "PREV" key input.

When the user presses the "ACCEPT" KEY while the portable terminal 200 is waiting for an "ACCEPT" key input and "PREV" key input, the flow advances to step S307, in which the portable terminal 200 displays "SPECIALCARD" on the display section 207. In step S308, the portable terminal 200 displays "CARD 3". After "CARD 3" is displayed, the portable terminal 200 waits for a "PREV" key input in step S309. When the user presses the "PREV" key in this wait state, the flow returns to step S303, in which the portable terminal 200 displays previous "CARD 2" on the display section 207.

When the user presses the "PREV" key while the portable terminal 200 is waiting for an "ACCEPT" key input and "PREV" key input in steps S305 and S306, the flow returns to step S301, in which the portable terminal 200 displays "CARD 1" on the display section 207.

As described above, according to the present invention, a unique ID is assigned to "special card", and the unique ID is referred to in displaying "special card". Therefore, a provider who provides contents can make the user browse advertisements and the like as "special card". In addition, "special card" is handled as common data, and hence needs to be transferred to the portable terminal only once. This makes it possible to reduce the amount of data transferred as compared with the conventional method. Note that a program may be described in WML to switch back display operation from card 3 to card 1. Obviously, when display operation is switched back from card 3 to card 1, "special card" may be displayed by using the "<disp" command.

As in description sample 3 described below, when a specific button on the terminal is pressed while "card" is displayed, control may be shifted to the command execution source. As a function of restoring an initial task by designated key operation, the "type" command is added to the "disp" command.

Description Sample 3
. . . . .
```
<wml>
    <card id="card1">
        <do type="ACCEPT"label="Next">
            <disp href="#specialcard" type="RESET"/>
            <go href="card2"/>
        </do>
        <p>
        CARD 1 <br/>
        Press ACCEPT to go to Next Card>
        </p>
    </card>
    <card id="card2">
        <do type="ACCEPT"label"Next">
            <disp href="#specialcard type="RESET"/>
            <go href="#card3"/>
        </do>
        <do type="PREV"label"Prev">
            <prv/>
        </do>
        <p>
        CARD 2 <br/>
        Press ACCEPT to go to Next Card <br/>
        Press PREV to go to Previous Card
        <p>
    </card>
    <card id="card3">
        <do type="PREV"label="Prev">
            <prev/>
        </do>
        <p>
        CARD 3 <br/>
        Press PREV to go to Previous Card
        </p>
    </card>
    <card id="specialcard">
        <p>
        SPECIAL CARD <br/>
        </p>
    </card>
</wml>
```
. . . . .

As description sample 4 described next, when "special card" is displayed, and a predetermined period of time has elapsed, control may be returned to the command execution source. In this case, the "value" parameter is added to the "disp" command. Description sample 4 descried below indicates a case wherein after a special card is displayed for two sec, the initial control, i.e., display control on the next card, is restored. Note that value="1" represents 0.1 sec.

Description Sample 4
. . . . .
```
<wml>
    <card id="card1">
        <do type="ACCEPT"label="Next">
            <disp href="#specialcard" value="20">
            <go href="card2"/>
        </do>
        <p>
        CARD 1 <br/>
        Press ACCEPT to go to Next Card>
        </p>
    </card>
    <card id="card2">
        <do type="ACCEPT"label="Next">
            <disp href="#specialcard"/
```

-continued
```
            value="20">
            <go href="#card3"/>
        </do>
        <do type="PREV"label="Prev">
            <prv/>
        </do>
        <p>
        CARD 2 <br/>
        Press ACCEPT to go to Next Card <br/>
        Press PREV to go to Previous Card
        </p>
    </card>
    <card id="card3">
        <do type="PREV"label="Prev">
            <prev/>
        </do>
        <p>
        CARD 3 <br/>
        Press PREV to go to Previous Card
        </p>
    </card>
    <card id="specialcard">
        <p>
        SPECIAL CARD <br/>
        </p>
    </card>
</wml>
```
. . . . .

In the above embodiment, browsing of "card" in one "deck" has been described. When another URL is designated by using "Prev" command, information in another "deck" can be temporarily browsed.

A case wherein contents corresponding to a designated URL are temporarily displayed will be described below.

When, for example, the picture of "http://www.xyz.com/index.html" on an Internet server is to be temporarily displayed, "<disp href=http://www.xyz.com/index.html>" and a reference destination are described. In connecting to this Internet server, since the page of the reference destination is described in the HTML language, the contents are converted into data in the WML language by the WAP gateway.

According to description sample 5, after the data corresponding to an URL designated in advance is displayed, the initial control, i.e., display control on the next card, is restored.

Description Sample 5
. . . . .
```
<wml>
    <card id="card1">
        <do type="ACCEPT"label="Next">
            <disp href="http://www.xyz.com/index.html"type="RESET"/>
            <go href="card2"/>
        </do>
        <p>
        CARD 1 <br/>
        Press ACCEPT to go to Next Card>
        </p>
    </card>
    <card id="card2">
        <do type="ACCEPT"label="Next">
            <disp href="http://www.xyz.com/index.html"/type="RESET"/>
            <go href="#card3"/>
        </do>
```

-continued

```
        <do type="PREV"label="Prev">
            <prv/>
        </do>
        <p>
        CARD 2 <br/>
        Press ACCEPT to go to Next Card <br/>
        Press PREV to go to Previous Card
        </p>
    </card>
    <card id="card3">
        <do type="PREV"label="Prev">
            <prev/>
        </do>
        <p>
        CARD 3 <br/>
        Press PREV to go to Previous Card
        </p>
    </card>
    <card id="specialcard">
        </p>
        SPECIAL CARD <br/>
        </p>
    </card>
</wml>
.....
```

As in description sample 6, when data corresponding to an URL designated in advance is displayed, control may be returned to the command execution source after a lapse of a predetermined period of time.

Description Sample 6
.....
```
<wml>
    <card id="card1">
        <do type="ACCEPT"label="Next">
            <disp href="http://
www.xyz.com/index.html" value="20">
            <go href="card2"/>
        </do>
        <p>
        CARD 1 <br/>
        Press ACCEPT to go to Next Card>
        </p>
    </card>
    <card id="card2">
        <do type="ACCEPT"label="Next">
            <disp href=http://
www.xyz.com/index.html"/value="20">
            <go href="#card3"/>
        </do>
        <do type="PREV"label="Prev">
            <prv/>
        </do>
        <p>
        CARD 2 <br/>
        Press ACCEPT to go to Next Card <br/>
        Press PREV to go to Previous Card
        </p>
    </card>
    <card id="card3">
        <do type="PREV"label="Prev">
            <prev/>
        </do>
        <p>
        CARD 3 <br/>
        Press PREV to go to Previous Card
        </p>
    </card>
    <card id="specialcard">
        <p>
        SPECIAL CARD <br/>
        </p>
    </card>
```

-continued

```
</wml>
.....
```

In the above embodiment, WAP used for portable telephones has been exemplified. However, the present invention is not limited to this, and may be applied to the format of transfer data in an information communication terminal in another network.

As has been described above, according to the present invention, there is provided a data transfer display method of transferring unit transfer data constituted by a plurality of unit display data made up of data to be displayed from a transmission source to an information communication terminal at a transmission destination, and displaying the unit display data at the information communication terminal, the unit transfer data being made up of special unit display data and the plurality of unit display data, comprising the first step of transferring unit transfer data from the transmission source to the information communication terminal, and the second step of, when the display of unit display data in the unit transfer data is designated at the information communication terminal, displaying the unit display data after displaying the special unit display data.

According to the present invention, by only preparing one special unit display data in one unit transfer data, the special unit display data can be displayed before display of given unit display data in the second step by only designating display of the given unit display data. As a consequence, according to the present invention, a waste of one unit transfer data received by the information communication terminal can be eliminated. In data communication by WAP or the like, therefore, a waste of data received by the information communication terminal can be suppressed.

In addition, there is provided a data transfer display method of transferring unit transfer data constituted by a plurality of unit display data made of data to be displayed from a transmission source to an information communication terminal at a transmission destination, and displaying the unit display data on the information communication terminal, first and second transmission sources being prepared, comprising the first step of transferring first unit transfer data from the first transmission source from the transmission source to an information communication terminal, and the second step of, when display of unit display data in the first unit transfer data is designated at the information communication terminal, transferring the second unit transfer data from the second transmission source to the information communication terminal, displaying predetermined unit display data in the second unit transfer data, and then displaying unit display data in the first unit transfer data.

According to the present invention, since predetermined unit display data of the second unit transfer data is displayed before display of unit display data of the first unit transfer data in the second step, there is no need to describe information about the first unit transfer data as a return destination in the second unit transfer data. This makes it possible to refer to the same unit transfer data from different unit transfer data. As a consequence, according to the present invention, a waste of one unit transfer data received by the information communication terminal can be eliminated. In data communication by WAP or the like, therefore, a waste of data received by the information communication terminal can be suppressed.

What is claimed is:

1. A data transfer display method comprising the steps of:

transferring first unit transfer data containing at least a plurality of unit display data from a first transmission source to a transmission destination; and when display of unit display data of the first unit transfer data is designated at the transmission destination, displaying the unit display data of the first unit transfer data and another display data, previously stored in the transmission destination wherein:
the first unit transfer data contains special unit display data and a plurality of unit display data, and
the step of displaying comprises displaying the unit display data of the first unit transfer data after the special unit display data is displayed.

2. A method according to claim 1, wherein the step of switching/displaying comprises the step of automatically switching to display unit display data of the first unit transfer data after the special unit display data is displayed for a predetermined period of time.

3. A method according to claim 1, wherein the step of switching/displaying comprises the step of switching display of the special unit display data to display of unit display data of the first unit transfer data when display of next unit display data is designated.

4. A data transfer display method, comprising:

transferring first unit transfer data containing at least a plurality of unit display data from a first transmission source to a transmission destination; and when display of unit display data of the first unit transfer data is designated at the transmission destination, displaying the unit display data of the first unit transfer data and another display data, previously stored in the transmission destination, wherein the step of displaying comprises the steps of:
transferring second unit transfer data from a second transmission source to the transmission destination when display of unit display data of the first unit transfer data is designated; and
displaying the unit display data of the first unit transfer data and the unit display data of the second unit transfer data at the transmission destination.

5. A method according to claim 4, wherein the step of displaying in the predetermined order comprises the step of switching/displaying unit display data of the first unit transfer data after unit display data of the second unit transfer data is displayed.

6. A method according to claim 5, wherein the step of switching/displaying comprises the step of automatically switching to display unit display data of the first unit transfer data after unit display data of the second unit transfer data is displayed for a predetermined period of time.

7. A method according to claim 5, wherein the step of switching/displaying comprises the step of switching display of unit display data of the second unit transfer data to display of unit display data of the first unit transfer data when display of next unit display data is designated.

8. A data transfer display method, comprising:

transferring first unit transfer data containing at least a plurality of unit display data from a first transmission source to a transmission destination; and when display of unit display data of the first unit transfer data is designated at the transmission destination, displaying the unit display data of the first unit transfer data and another display data, previously stored in the transmission destination, wherein:
the transmission source is a control station, and
the transmission destination is a portable terminal for performing information communication with the control station through a radio base station.

9. A data transfer display method, comprising:

transferring unit transfer data from a server to a portable terminal, where in the unit transfer data comprises a plurality of unit display data;

displaying, in a display section of the portable terminal, the plurality of unit display data;

when a first function key of the portable terminal is pressed, displaying in the display section special unit display data;

if, after the display of the special unit display data, a second function key of the portable terminal is pressed, re-displaying in the display section the plurality of unit display data;

if, after the display of the special unit display data, the first function key is pressed, displaying in the display section another special unit display data; and when, after re-displaying the plurality of unit display data or displaying another special unit display data, the second function key is pressed, re-displaying in the display section the special unit display data.

* * * * *